(12) United States Patent
Green

(10) Patent No.: US 6,253,287 B1
(45) Date of Patent: Jun. 26, 2001

(54) USING THREE-DIMENSIONAL STORAGE TO MAKE VARIABLE-LENGTH INSTRUCTIONS APPEAR UNIFORM IN TWO DIMENSIONS

(75) Inventor: Thomas S. Green, Austin, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

(21) Appl. No.: 09/150,310

(22) Filed: Sep. 9, 1998

(51) Int. Cl.[7] ........................................ G06F 12/04
(52) U.S. Cl. ........................... 711/125; 711/118; 711/123; 711/202; 711/205; 711/206; 712/208; 712/213; 712/210
(58) Field of Search ........................... 711/118, 123, 711/125, 202, 205, 206, 207; 712/208–213

(56) References Cited

U.S. PATENT DOCUMENTS

| | | | |
|---|---|---|---|
| 5,488,710 | * | 1/1996 | Sato et al. ............................. 711/125 |
| 5,767,865 | * | 6/1998 | Inoue et al. ........................... 345/519 |
| 5,963,905 | * | 10/1999 | Novak et al. ......................... 704/254 |
| 5,991,863 | * | 11/1999 | Dao et al. ............................. 711/219 |

* cited by examiner

Primary Examiner—Than Nguyen
(74) Attorney, Agent, or Firm—Conley, Rose & Tayon, PC; Dan R. Christen

(57) ABSTRACT

A microprocessor capable of predecoding variable-length instructions and storing them in a three-dimensional instruction cache is disclosed. The microprocessor may comprise a predecode unit, an instruction cache, and an address translation table. The predecode unit receives variable-length instructions from a main memory subsystem. These instructions are then predecoded by detecting instruction field boundaries within each variable-length instruction. Instructions fields that are not present in a particular instruction may be added by inserting padding constants so that the instruction matches a predetermined format having all instruction fields. The predecoded instruction is stored in the instruction cache, which may be logically and physically structured as a three-dimensional array. Each instruction is stored in the cache so that it has a fixed length in two dimensions. The address translation table maintains address translations for each instruction stored in the instruction cache. Fetch addresses are input to the address translation table and, if there is a cache hit, corresponding pointers that points to the desired instruction storage locations within the instruction cache are output. The address translation table may maintain more than one pointer for each fetch address and may also store branch prediction information. A corresponding method and computer system are also disclosed.

28 Claims, 12 Drawing Sheets

CENTRAL WINDOW

USING THREE-DIMENSIONAL STORAGE TO MAKE VARIABLE-LENGTH INSTRUCTIONS APPEAR UNIFORM IN TWO DIMENSIONS

BACKGROUND OF THE INVENTION

1. Field of the Invention

This invention relates to storing and scanning variable-length instructions in a microprocessor.

2. Description of the Relevant Art

The number of software applications written for the x86 instruction set is quite large. As a result, despite the introduction of newer and more advanced instruction sets, microprocessor designers have continued to design microprocessors capable of executing the x86 instruction set.

The x86 instruction set is relatively complex and is characterized by a plurality of variable-length instructions. A generic format illustrative of the x86 instruction set is shown in FIG. 1. As illustrated in the figure, an x86 instruction consists of from one to five optional prefix bytes 102, followed by an operation code (opcode) field 104, an optional addressing mode (Mod R/M) byte 106, an optional scale-index-base (SIB) byte 108, an optional displacement field 110, and an optional immediate data field 112.

The opcode field 104 defines the basic operation for a particular instruction. The default operation of a particular opcode may be modified by one or more prefix bytes 102. For example, one of prefix bytes 102 may be used to change the address or operand size for an instruction, to override the default segment used in memory addressing, or to instruct the processor to repeat a string operation a number of times. The opcode field 104 follows prefix bytes 102, if present, and may be one or two bytes in length. The addressing mode (Mod R/M) byte 106 specifies the registers used as well as memory addressing modes. The scale-index-base (SIB) byte 108 is used only in 32-bit base-relative addressing using scale and index factors. A base field within SIB byte 108 specifies which register contains the base value for the address calculation, and an index field within SIB byte 108 specifies which register contains the index value. A scale field within SIB byte 108 specifies the power of two by which the index value will be multiplied before being added, along with any displacement, to the base value. The next instruction field is a displacement field 110, which is optional and may be from one to four bytes in length. Displacement field 110 contains a constant used in address calculations. The optional immediate field 112, which may also be from one to four bytes in length, contains a constant used as an instruction operand. The shortest x86 instructions are only one byte long, and comprise a single opcode byte. The 80286 sets a maximum length for an instruction at 10 bytes, while the 80386 and 80486 both allow instruction lengths of up to 15 bytes.

The complexity of the x86 instruction set poses many difficulties in implementing high performance x86-compatible microprocessors. In particular, the variable length of x86 instructions makes decoding instructions difficult. Decoding instructions typically involves determining the boundaries of an instruction and then identifying each field within the instruction, e.g., the opcode and operand fields. Decoding typically takes place once the instruction is fetched from the instruction cache before execution.

One method for determining the boundaries of instructions involves generating a number of predecode bits for each instruction byte read from main memory. The predecode bits provide information about the instruction byte they are associated with. For example, an asserted predecode start bit indicates that the associated instruction byte is the first byte of an instruction. Similarly, an asserted predecode end bit indicates that the associated instruction byte is the last byte of an instruction. Once the predecode bits for a particular instruction byte are calculated, they are stored together with the instruction byte in an instruction cache. When a "fetch" is performed, i.e., a number of instruction bytes are read from the instruction cache, the associated start and end bits are also read. The start and end bits may then be used to generate valid masks for the individual instructions within the fetch. A valid mask is a series of bits in which each bit corresponds to a particular instruction byte. Valid mask bits associated with the first byte of an instruction, the last byte of the instruction, and all bytes in between the first and last bytes of the instruction are asserted. All other valid mask bits are not asserted.

Turning now to FIG. 2, an exemplary valid mask is shown. The figure illustrates a portion of a fetch 120 and its associated start and end bits 122 and 124. Assuming a valid mask 126 for instruction B 128 is to be generated, start and end bits 122 and 124 would be used to generate the mask. Valid mask 126 could then be used to mask off all bytes within fetch 120 that are not part of instruction B 128.

Once the boundaries of an instruction have been determined, the fields within the instruction, e.g., the opcode and operand fields, may be identified. Once again, the variable length of x86 instructions complicates the identification process. In addition, the optional prefix bytes within an x86 instruction create further complications. For example, in some instructions the opcode will begin with the first byte of the instruction, while others may begin with the second, third, or fourth byte.

To perform the difficult task of decoding x86 instructions, a number of cascaded levels of logic are typically used. Thus, decoding may require a number of clock cycles and may create a significant delay before any instructions are available to the functional stages of the microprocessor's pipeline. As microprocessors increase the number of instructions they are able to execute per clock cycle, instruction decoding may become a performance limiting factor. Therefore, a mechanism for simplifying the complexity and time required for instruction decoding is needed.

SUMMARY OF THE INVENTION

The problems outlined above may in part be solved by a microprocessor capable of predecoding instructions to fixed field lengths and then storing them in a "threedimensional" instruction cache. Broadly speaking, in one embodiment a microprocessor capable of efficient instruction decoding comprises a predecode unit and an instruction cache. The predecode unit is coupled to receive variable-length instructions from a main memory subsystem. The variable-length instructions are then predecoded by detecting instruction field boundaries within each instruction. Once the instruction fields have been determined, the instruction is conveyed to the instruction cache for storage. The instruction cache is coupled to the predecode unit and comprises an array of instruction storage locations. Each instruction storage location in turn comprises an array of instruction field storage locations. Each instruction field storage location is configured to store a particular type of instruction field and comprises at least enough memory cells to store the maximum number of instruction bytes possible for the corresponding type of instruction field. The instruction cache may be logically configured as a three-dimensional array of memory cells. The instruction cache may also be physically configured as a three-dimensional array by forming the constituent memory cells on different layers of the microprocessor's die.

Using a three-dimensional configuration may advantageously allow each instruction to have the same length in two dimensions. This may in turn greatly simplify the task of determining the boundaries of instructions read from the instruction cache. Using a three-dimensional configuration may also allow instructions to be stored in fixed field width format. This, in turn, may potentially reduce or even eliminate the delay and hardware associated with determining instruction field boundaries for instructions read from the instruction cache.

In another embodiment, the instruction cache may be configured as a plurality of two-dimensional arrays, each configured to store a particular type of instruction field. These arrays may be formed either on one layer or on multiple layers of the die.

In another embodiment, the microprocessor may further comprise an address translation table coupled to the instruction cache. The address translation table may comprise a plurality of address entries, each comprising a fetch address tag and a corresponding pointer that points to a particular instruction storage location within the instruction cache. The fetch address tag is compared with the fetch address to find the correct pointer. In one embodiment, the address translation table may store multiple pointers and branch prediction information with each address tag.

A method for storing instructions in a microprocessor is also contemplated. In one embodiment, the method comprises receiving instruction bytes from a memory subsystem, predecoding the instruction bytes to identify instructions and instruction field boundaries within the instructions, and storing each field for each instruction in an instruction cache that is logically configured as three dimensional. The method may further comprise storing at least a portion of each instruction's address into an address translation table as a fetch address tag. One or more pointers may be stored with the fetch address tag in the address translation table. These pointers point to the storage location within the instruction cache that is storing an instruction associated with the corresponding fetch address tag. In another embodiment, a run counter may be stored with the address tag and pointers. The run counter is indicative of the number of instructions occurring in program order before a branch instruction that is predicated taken.

A computer system capable of utilizing one or more of the microprocessors described above is also contemplated. In one embodiment, the computer system comprises a microprocessor as described above and a bus bridge. The bus bridge may be coupled to the microprocessor via a high-speed CPU bus. Peripherals, such as a modem, may be coupled to the microprocessor via the bus bridge. In another embodiment, the computer system may comprise a second microprocessor coupled to the first via the CPU bus.

BRIEF DESCRIPTION OF THE DRAWINGS

Other objects and advantages of the invention will become apparent upon reading the following detailed description and upon reference to the accompanying drawings in which.

Figure 1:
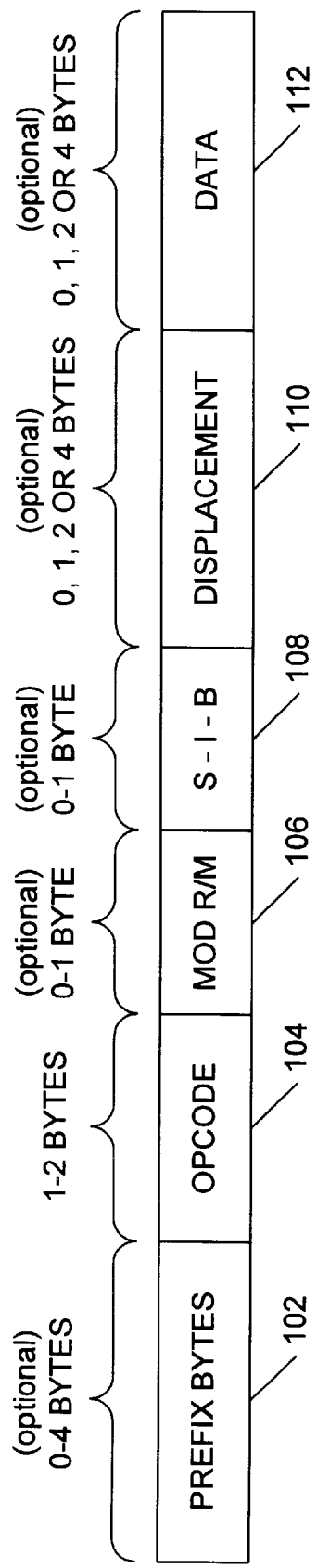
FIG. 1 is a block diagram of the generic x86 instruction format.
Figure 2:
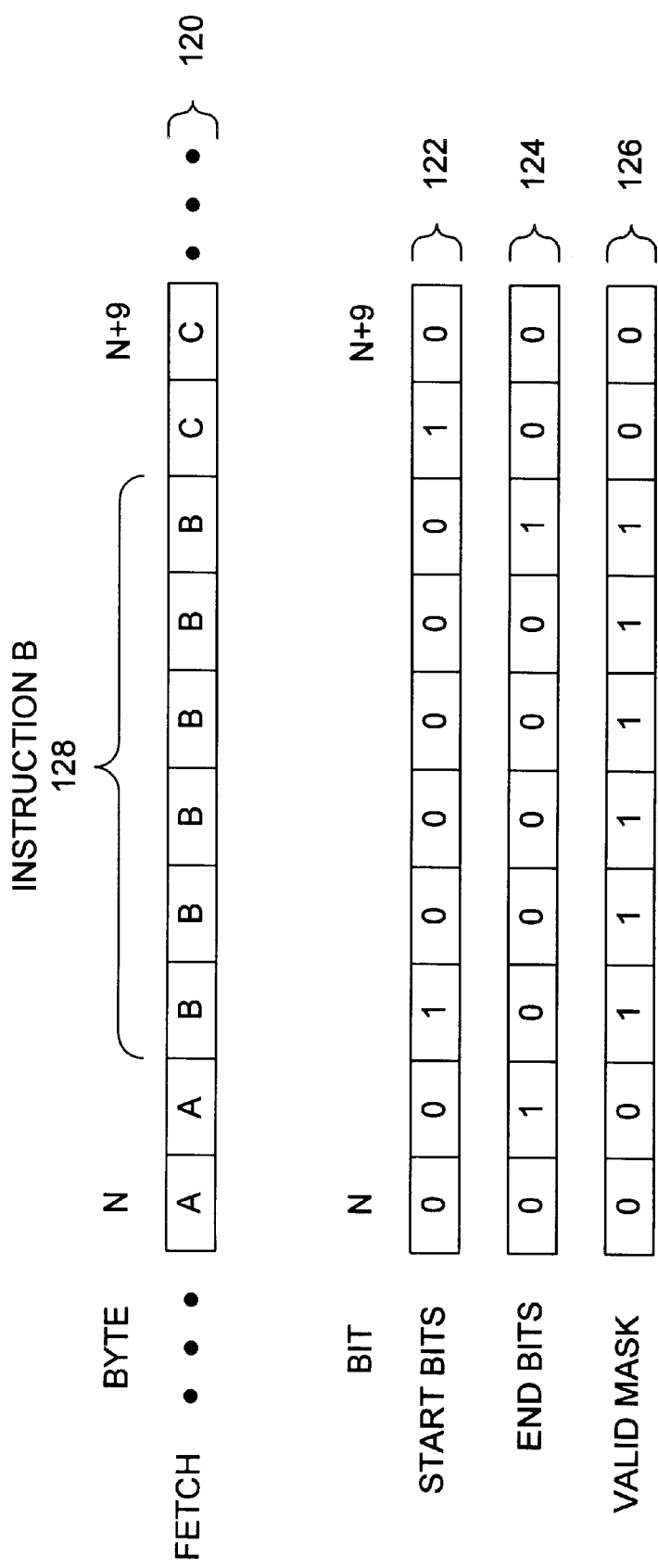
FIG. 2 is a block diagram illustrating the formation of one type of valid mask.

While the present invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF SEVERAL EMBODIMENTS

Figure 3:
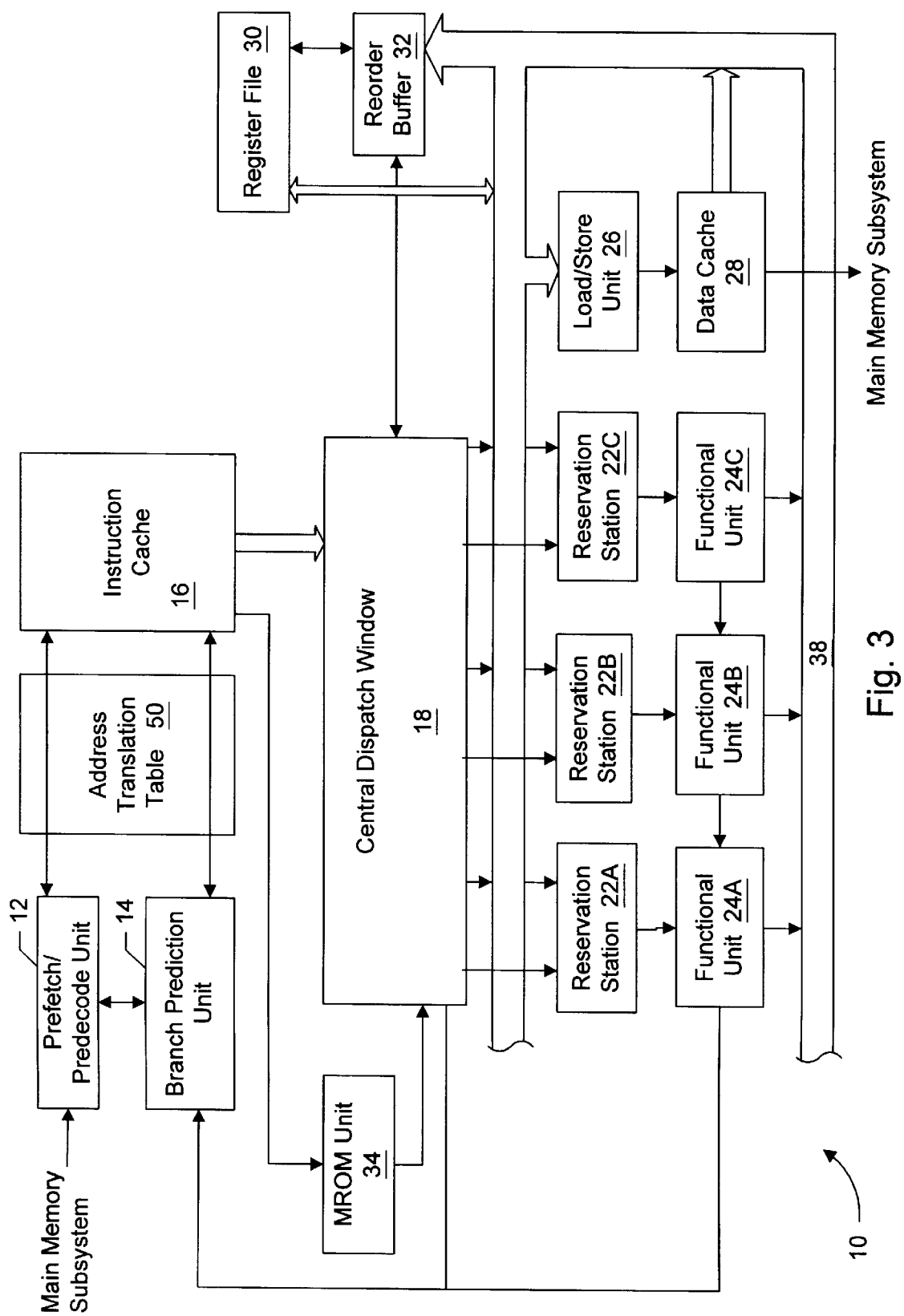
FIG. 3 is a block diagram of one embodiment of a microprocessor that is configured to predecode variable-length instructions.

Turning now to FIG. 3, a block diagram of one embodiment of a microprocessor 10 that is configured to decode instructions out of order is shown. In this embodiment, microprocessor 10 includes a prefetch/predecode unit 12, a branch prediction unit 14, and an address translation table 60 coupled to an instruction cache 16. Central dispatch window 18 is coupled between instruction cache 16 and reservation stations 22A–C. A microcode read-only memory (MROM) unit 34 is also coupled to central dispatch window 18. Reservations stations 22A–C are coupled to a corresponding number of functional units 24A–C, and load/store unit 26 is coupled to a data cache 28. Finally, a result bus 38 couples functional units 24A–C and data cache 28 to reorder buffer 32, register/future file 30, load/store unit 26, and reservations stations 22A–C.

Generally speaking, instruction cache 16 is a high speed cache memory provided to temporarily store instructions before they are fetched and conveyed to central dispatch window 18. In one embodiment, instruction cache 16 is configured to store up to 32 kilobytes of instruction code. Instruction cache 16 may be organized as an array of 16 byte instruction storage locations. Each instruction storage location, in turn, may be configured as an array of instruction field storage locations. This configuration is described in greater detail below. During operation, instructions are provided to instruction cache 16 by prefetching instruction bytes from a main memory (not shown) through prefetch/predecode unit 12. It is noted that instruction cache 16 may be implemented in set-associative, fully-associative, or direct-mapped configurations.

As noted above, prefetch/predecode unit 12 prefetches instruction code from the main memory for storage within instruction cache 16. In one embodiment, prefetch/ predecode unit 12 is configured receive and decode 64-bit wide bursts of code from the main memory. It is understood that a variety of specific code prefetching techniques and algorithms may be employed by prefetch/predecode unit 12.

As prefetch/predecode unit 12 fetches instruction bytes from main memory, instruction boundaries within the stream of instruction bytes are detected. Prefetch/predecode unit 12 then uses these boundaries to predecode each instruction. As used herein, predecoding refers to determining which instruction fields are present within a particular instruction and where those instruction fields' boundaries are within each instruction. Once an instruction has been predecoded, it is conveyed to instruction cache 16 for storage. Prefetch/ predecode unit 12 may be configured to convey the predecoded instructions in a predetermined format (e.g., across a high speed dedicated bus having separate lines for each field) so that each instruction is stored in instruction cache 16 in a fixed format. Since some instructions may not have all possible instruction fields, prefetch/predecode unit 12 may be configured to "pad" the empty instruction fields by filling them with constants (e.g., zero). In another embodiment, predecode unit 12 may be configured to also convey a valid bit for each instruction field indicative of whether the field is present in the current instruction.

Prefetch/predecode unit 12 may further be configured to calculate and convey a plurality of predecode bits with each predecoded instruction. The predecode bits may convey additional information about each instruction. For example, one predecode bit may indicate whether the given instruction may be decoded executed directly by functional units 24A–B, or whether the instruction is to be executed by invoking a sequence of microcode instructions stored within MROM unit 18, as described in further detail below. Another predecode bit may indicate the presence of a two-byte opcode. For example, in the x86 instruction set all instructions having two-byte opcodes have a value of 0F (hex) as their first opcode byte. Advantageously, using a predecode bit to indicate the presence of two-byte instruction opcode may allow all opcodes to be stored in a single-byte field. The predecode bits (collectively referred to herein as tags) may be stored along with the instructions in instruction cache 16. To improve the flow of data from predecode unit 12 to instruction cache 16, predecode unit 12 may have a FIFO (first-in first-out) memory buffer at its input to receive and store the instruction byte sequences until predecode unit 12 is ready to predecode them.

Address translation table 50 is coupled to predecode unit 12 and instruction cache 16 and is configured to store address translations for instructions stored within instruction cache 16. As noted above, instructions having fewer than the maximum number of instruction fields may be padded with constants. This may shift a particular instruction's location relative to its original address. Address translation table 50 provides a look-up table that correlates an instruction's original address to a pointer or index that points to the storage location in instruction cache 16 in which the instruction is stored.

Before describing the interaction between predecode unit 12, address translation table 50, and instruction cache 16 in greater detail (see section below entitled "Details of Instruction Cache"), other general aspects of microprocessor 10 will be discussed.

When an instruction is fetched, the fetch address is translated by address o translation table 50, and the corresponding instruction storage location in instruction cache 16 is read. In one embodiment, instruction cache 16 may be configured to output three stored instructions to central dispatch window 18 per clock cycle. Central window 18 receives the instructions and begins the process of retrieving any necessary operands (e.g., memory and or register operands). In one embodiment, central window 18 may be configured to monitor result bus 38 for results that are referenced as operands by stored instructions. If such a result is detected, central window 18 may forward the result to the corresponding pending instruction. Similarly, data from load instructions executed by load/store unit 26 may also be monitored and forwarded.

Central window 18 also determines which instructions should be dispatched to reservation stations 22A–C and load/store unit 26 each clock cycle. Central window 18 may base its selection of which instructions to dispatch based upon a number of factors, including: (1) the availability of reservation stations 22A–C and the corresponding functions performed by their respective functional units 24A–C, (2) whether the particular instruction in question is ready for dispatch (i.e., its operand values have been received), and (3) the relative position in program order of the instruction in question (i.e., the oldest instructions ready for dispatch are dispatched first). Advantageously, by waiting for an instruction's operand values to be received before dispatching the instruction, dependency checking may be performed. Note in other embodiments of microprocessor 10, dependency checking may also be performed in reservation stations 22A–C. As long as there are no dependencies, central window 18 may dispatch instructions out-of-order. Advantageously, out-of-order execution in combination with speculative execution tends to increase performance by preventing functional units 24A–C from stalling. In the embodiment illustrated, instructions may be speculatively executed based upon branch prediction information stored in branch prediction unit 14.

In one embodiment, central window 18 may normally receive three instructions per clock cycle and also dispatch three instructions per clock cycle. Once an instruction is dispatched from central window 18, its storage location may be cleared or marked as empty, e.g., by setting or clearing a corresponding status bit. In one embodiment, central window may be configured as an array with each row in the array storing three instructions. After each clock cycle, the storage locations may be configured to shift a variable amount in order to fill in any gaps created by dispatched instructions.

Central window 18 may also receive instructions from MROM unit 34. When instruction cache 16 detects that an instruction being output is too complex for functional units 24A–24C to execute directly, it may route the instruction to MROM unit 34 in lieu of central window 18. In response, MROM unit 34 conveys a sequence of simpler microcode instructions to central window 18. The microcode instructions are stored in central window 18 and receive reorder buffer tags in a similar manner to non-MROM ("fast-path") instructions.

While central window 18 is receiving instructions from instruction cache 16, reorder buffer 32 may be configured to issue each instruction a reorder buffer tag which serves to identify each instruction's relative position in program order. This may advantageously allow instructions to execute out of order. The reorder buffer tags follow each outstanding instruction through central window 18, reservation stations 22A–C, and functional units 24A–C. Reorder buffer 32 may also reserve a storage location for the result of each instruction. When an instruction completes execution, its results and reorder buffer tag are output by functional units 24A–C onto result bus 38. Reorder buffer 32 monitors result bus 38 and stores the results in the corresponding reserved storage location. Each clock cycle, reorder buffer 32 may retire up to three instructions. An instruction is retired by copying its results to the architectural register file 30, thereby updating the architectural state of microprocessor 10. Advantageously, reorder buffer 32 operates to keep track of the original program sequence for register read and write operations, implements register renaming, allows for speculative instruction execution and branch misprediction recovery, and facilitates precise exceptions.

Reservation stations 22A–C act as buffers for their corresponding functional units 24A–C by storing instructions until they are executed. The instructions wait in reservation stations 22A–C or load/store unit 26 until the corresponding functional unit's first execution pipeline stage is available to accept a new instruction. At that point, the instructions may enter functional units 24A–C for execution. In one embodiment, each functional unit 24A–C is configured to perform integer arithmetic operations of addition and subtraction, as well as shifts, rotates, logical operations, and branch operations. It is noted that a floating point unit (not shown) may also be employed to accommodate floating point operations.

Register file 30 comprises two sets of registers. One set comprises the x86 architectural registers, including eight 32-bit real registers (i.e., typically referred to as EAX, EBX, ECX, EDX, EBP, ESI, EDI and ESP). The second set comprises registers for storing the most recent speculative set of values for each architectural register. This "future file" of registers provides a convenient place from which to forward speculative register values to pending instructions (e.g., to central window 18). If reorder buffer 32 has a result storage location reserved for a value that will update the desired register, the operand value (or tag thereto) is provided from reorder buffer 32 rather than from register file 30. If there is no location reserved for a required register in reorder buffer 32, the value is taken directly from register file 30. If the operand corresponds to a memory location, the operand value is provided to central window 18 from load/store unit 26.

The results of each executed instruction are stored in reorder buffer 32 until the instruction is "retired". Retiring an instruction refers to copying the instruction's results to architectural register file 30 and thereby updating the microprocessor's non-speculative architectural state. As previously noted, reorder buffer tags follow each instruction through reservation stations 22A–C and functional units 24A–C. Thus, the results may be identified and attributed to the appropriate instruction within reorder buffer 32. Once the results are received, reorder buffer 32 retires instructions in-order in a line-by-line fashion, waiting to retire a line of instructions until the following conditions are met: (1) the line is the oldest line of instructions stored within reorder buffer 32, and (2) each instruction in the line has completed execution without an exception or branch misprediction. Note that other variations of reorder buffer 32 are also possible. For example, in another embodiment reorder buffer 32 may individually retire instructions as opposed to retiring them in a line-by-line manner. Reorder buffer 32 may be implemented in a first-in-first-out configuration wherein speculative results move to the "bottom" of the buffer as they are validated and written to register file 30, thus making room for new entries at the "top" of the buffer.

In the event of a branch misprediction, central window 18, reorder buffer 32, reservation stations 24A–C, and load/store unit 26 may be configured to flush all pending instructions occurring after the mispredicted branch instruction in program order. Furthermore, the contents of the architectural register file within register/future file 28 are copied to the future file to replace any erroneous values created by the execution of instructions along the mispredicted branch path. Branch mispredictions may be detected by functional units 32A–B, which forward the results of branch instructions to branch prediction unit 14.

Generally speaking, load/store unit 34 provides an interface between functional units 32A–C and data cache 36. In one embodiment, load/store unit 34 is configured with a load/store buffer that has eight storage locations for storing data and address information from pending loads or stores. Load/store unit 34 also performs dependency checking for load instructions against pending store instructions to ensure that data coherency is maintained. Data cache 36 is a high speed cache memory provided to temporarily store data being transferred between load/store unit 34 and the main memory subsystem. In one embodiment, data cache 36 has a capacity of storing up to 32 kilobytes of data. It is understood that data cache 36 may be implemented in a variety of sizes and specific memory configurations, including set associative, fully associative, and direct mapped configurations.

Figure 4:
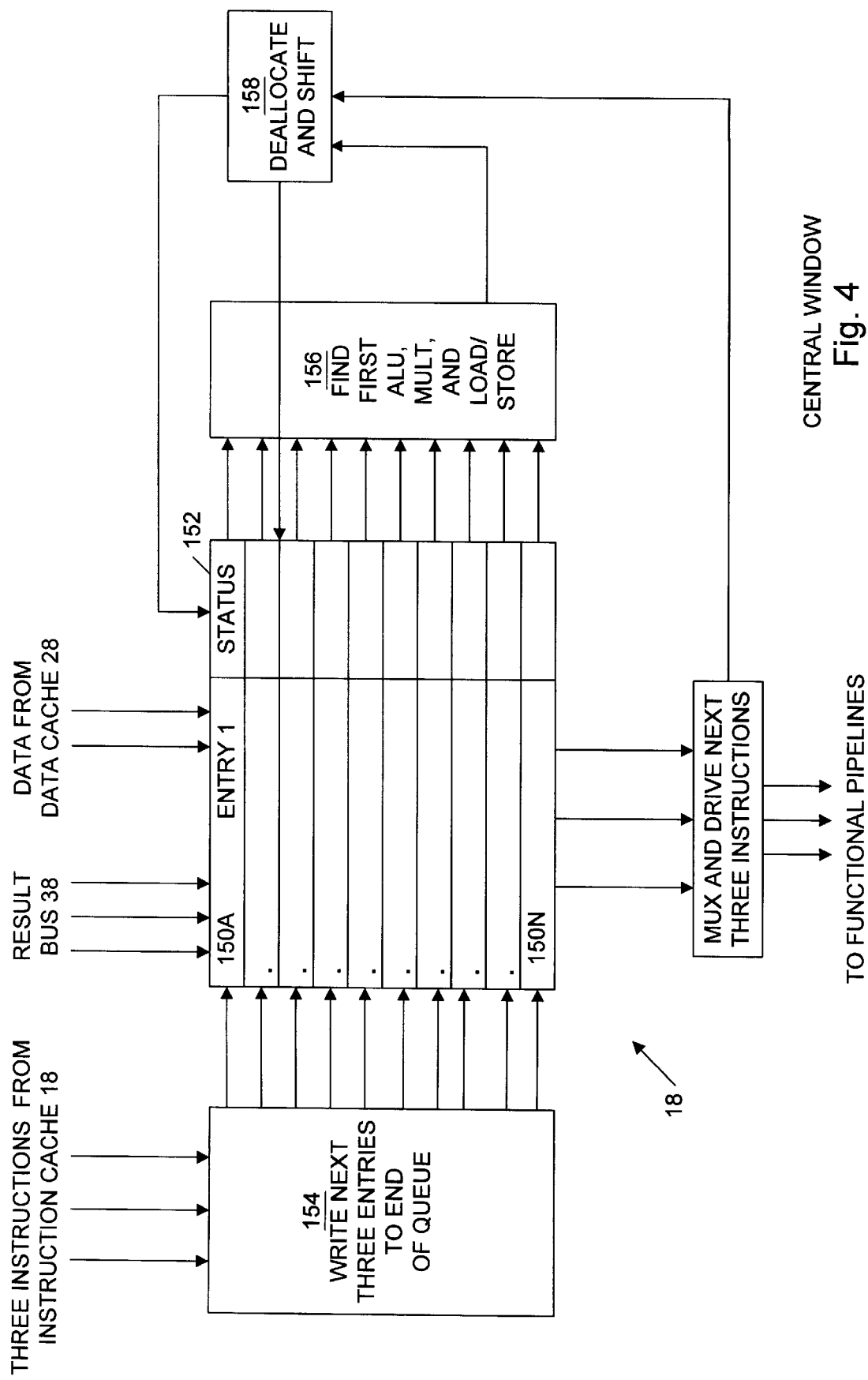
FIG. 4 is a block diagram illustrating details of one embodiment of the central window from the microprocessor of FIG. 3.

Turning now to FIG. 4, a block diagram of one embodiment of central window 18 is shown. Central window 18 is where all instructions are held until they are ready to be issued to reservation stations 22A–C and functional units 24A–C, respectively. In one embodiment, each central window entry 150A–150N is composed of the predecoded instruction with source and destination values or tags, the instruction's reorder buffer tag, and a status field 152. Central window 18 is configured to allocate and retire up to three entries per clock cycle. Central window 18 is configured as a shiftable/collapsible FIFO, much like load/store unit 26. Selection unit 154 allows each entry 150A–150N to be loaded from any of the three issue positions, and each entry 150A–150N is capable of issuing to any of the three reservation stations 22A–C. Each entry 150A–150N is able to independently shift 0, 1, 2, or 3 positions in a single clock cycle. Advantageously, this ability to shift may allow the remaining entries to fill in the gaps created by an instruction that is issued out of order. Issue unit 156 searches the contents of central window 18 to find the first instruction ready to be issued to each of the three reservation station/functional unit pipes. While instructions may be executed out of order, preference is given to the oldest instructions outstanding in central window 18. Once an instruction is issued to the appropriate functional pipe, deallocation unit 158 clears the status field of the entry, thereby indicating that the entry is available to store a new instruction. Deallocation unit 158 also controls the shifting of the entries to fill in any gaps. Advantageously, the vacated entries may be ready to be filled when the next clock cycle occurs.

Figure 5:
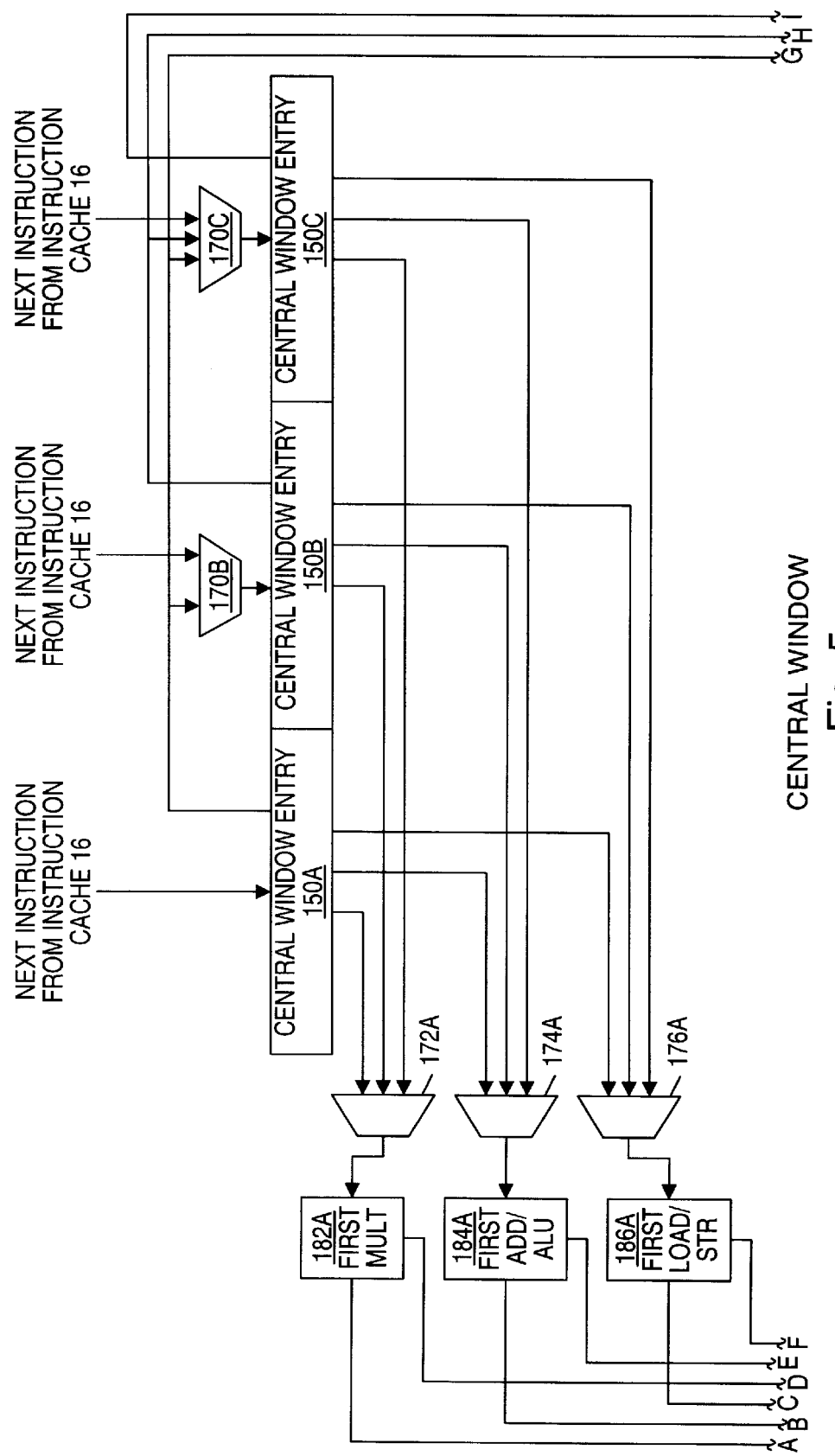
FIG. 5 is a block diagram illustrating further details of one embodiment of the central window from FIG. 4.
Figure 5:
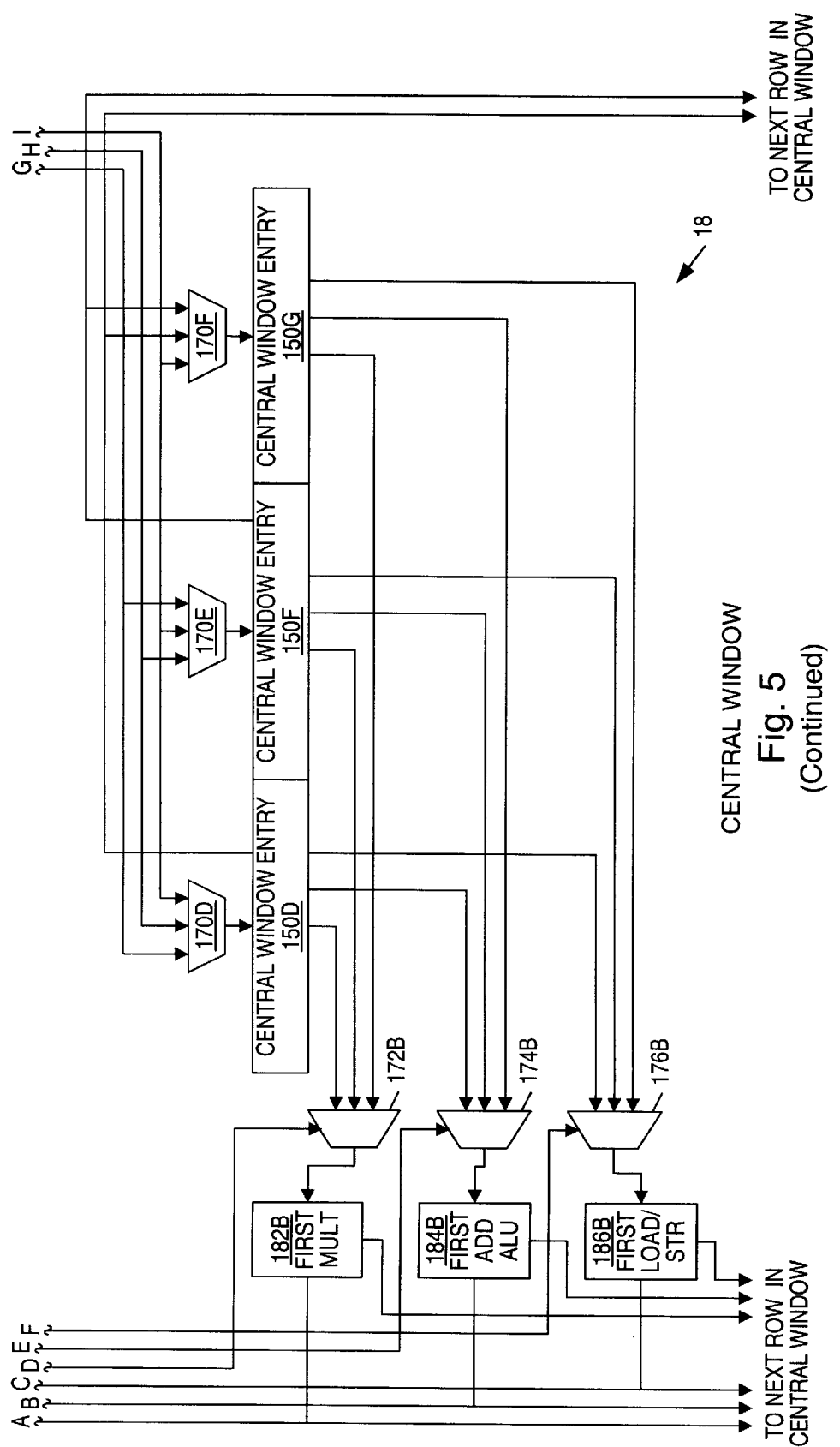

Turning now to FIG. 5, detail of the first six entries in one embodiment of central window 92 are shown. Central window 92 is configured into rows, each row having three entries. Each entry in the first row (i.e., entries 150A–150C) is capable of receiving instructions directly from translation unit 86 and operands from register file 30. Up to three instructions may be written per clock cycle. As previously explained, central window 18 operates in a FIFO-like manner, with instructions stored in entries 150A–150N propagating through each line of central window until being selected for issue to the three reservation stations 22A–C. Unlike a FIFO, however, the contents of any entry may be issued, even if there are other instructions before and after it in central window 18. Multiplexers 170B–170F, which are part of selection unit 154, allow entries to be shifted towards the bottom of central window 18, thereby filling in any gaps created when an instruction is issued. Each entry's contents are capable of shifting up to three positions in a clock cycle. For example, the contents of entry 150A can shift to entry 150B (via multiplexer 170B), entry 150C (via multiplexer 170C), or entry 150D (via multiplexer 170D).

Multiplexers 172A–176B and issue sub-units 182A–186B are part of issue unit 156, and operate to select and issue up to three instructions each clock cycle, i.e., one for each of the reservation station/functional unit pipelines. Every clock cycle, multiplexers 172A–B and issue sub-units 182A–B select the oldest instruction ready to be issued to functional unit 24A. Similarly, multiplexers 174A–B and issue sub-units 184A–B select the oldest instruction ready to be issued to functional units 24B–C. An instruction is ready to issue when all operand dependencies have been resolved. While only six entries 150A–150F are shown in FIG. 5, more entries are contemplated. In addition, while the embodiments illustrated show three reservation station/functional unit pipelines, other numbers are possible. For example, a multiplier functional unit pipeline and a floating point unit pipeline may be added.

Details of Instruction Cache

Figure 6A:
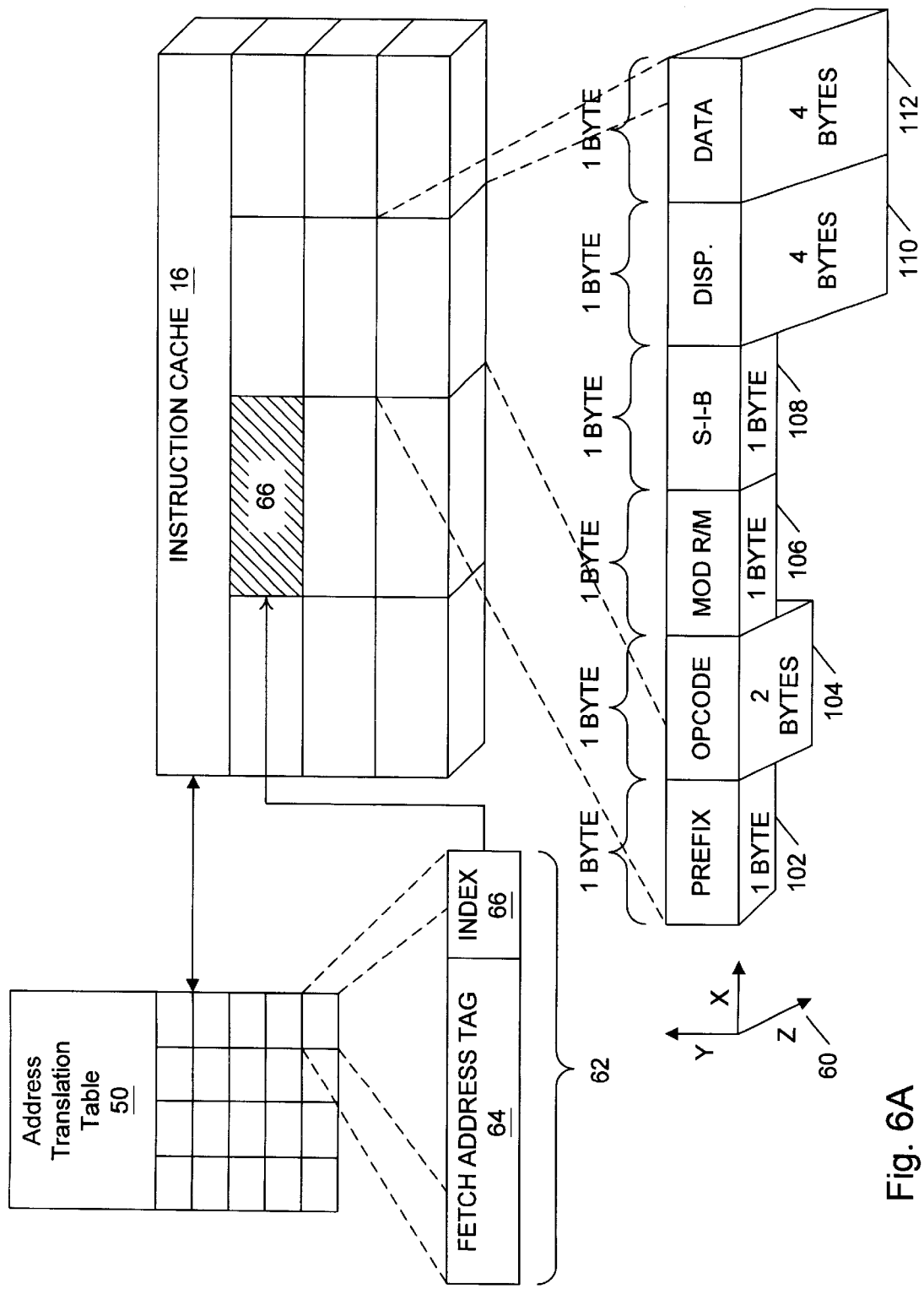
FIG. 6A is a block diagram showing more detail of one embodiment of the instruction cache from FIG. 3.

Turning now to FIG. 6A, more details regarding one embodiment of address translation table 50 and instruction cache 16 are shown. As the figure illustrates, instructions having variable lengths are reorganized and stored in instruction cache 16 so as to have a constant length in two dimensions (labeled X and Y in the figure). In the embodiment illustrated, instruction cache 16 is "logically configured" as a three-dimensional (X, Y, and Z) array, with each instruction having a constant length of six bytes in the X dimension and a constant height of one bit in the Y dimension. As used herein, the term "logically configured" refers to how individual bytes and storage locations within instruction cache 16 are accessed (addressed). This is in contrast with instruction cache 16's physical configuration, i.e., the positioning of its transistors on a semiconductor substrate (die). In some embodiments, instruction cache 16 may be logically configured as three-dimensional while being physically configured as two-dimensional. In other embodiments, instruction cache 16 may be both logically and physically configured as three-dimensional (i.e., with the third physical dimension, indicated by arrow 60, referring to the different layers of the wafer or die upon which instruction cache 16 is formed). For example, each bit or byte of each instruction field may be stored on a different layer. Instructions stored within cache 16 are configured such that each instruction's fields are stored in the same position in each instruction storage location.

In one embodiment, each instruction storage location within cache 16 is configured to store the predecoded and padded x86 instruction fields previously described. Prefix field 102, however, may be compressed into one byte to reduce the amount of storage space needed for each instruction. Any fields comprising more than one byte may have their additional bytes stored in the third (Z) dimension. Since each instruction stored within cache 16 has a corresponding mapping within address translation table 50, cache 16 is effectively fully associative (i.e., any instruction may be stored in any storage location).

Address translation table 50 may be direct mapped, set associative, or fully associative. Address translation table 50 receives requested fetch addresses and translates them into pointers or indexes into instruction cache 16. The example embodiment of address translation table 50 shown in the figure is set associative, and example entry 62 comprises a fetch address tag 64 and pointer (or index) 66. In this configuration a first portion of the fetch address is used to select the row within address translation table 50. Once the row is selected, an entry within the row is selected by comparing a second portion of the fetch address with the fetch address tags stored in each entry. A match selects the desired column or "way" within address translation table 50. The entry residing at intersection of the selected row and way is read, and the pointer stored therein is used to select the corresponding instruction storage location in instruction cache 16. When the selected instruction is output from instruction cache 16 to central window 18, the multi-dimensional fixed-field format may be retained, or the instruction may be expanded to a single dimensional sequence of instruction bytes (e.g., with padding constants in any unused fields).

Figure 6B:
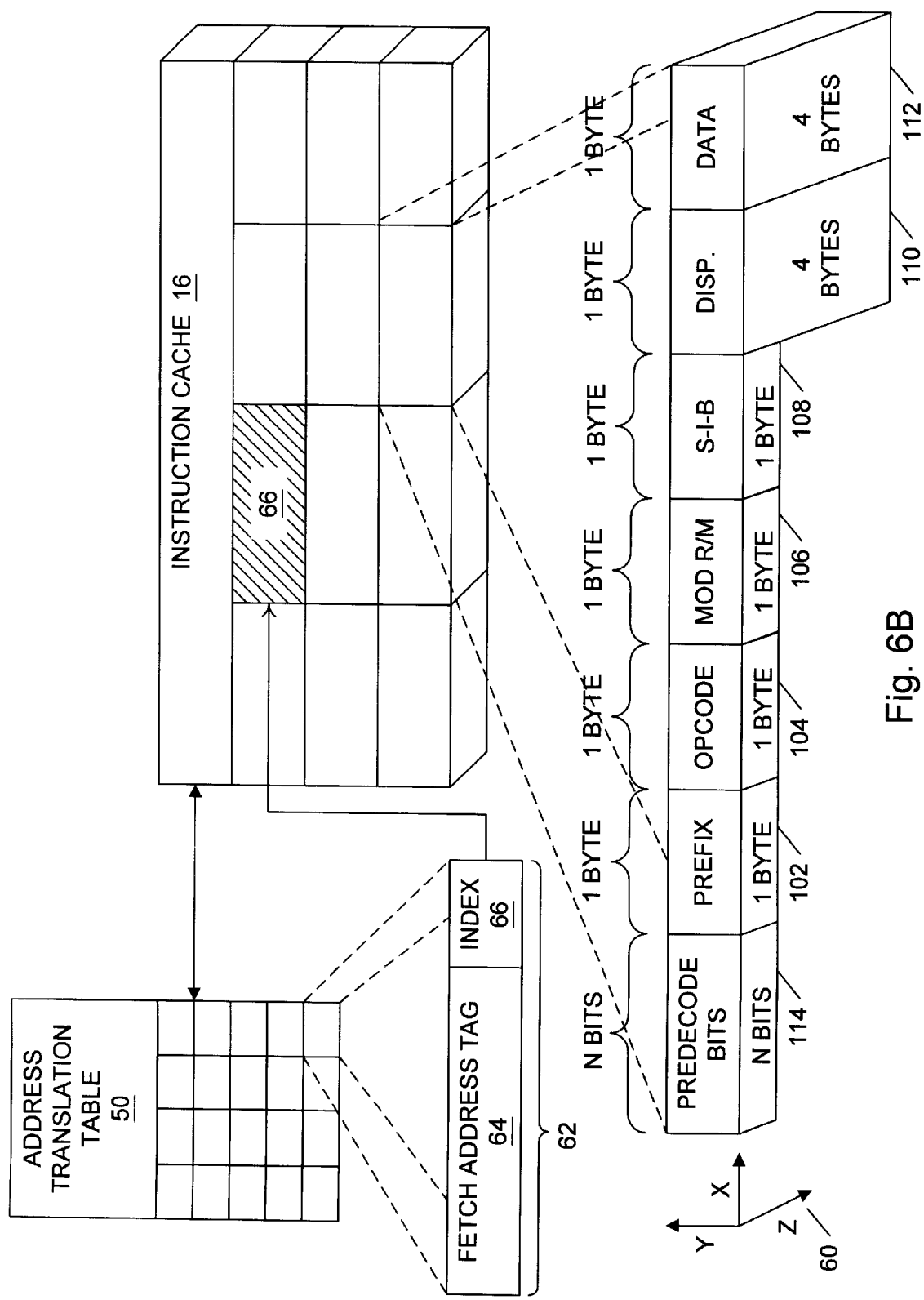
FIG. 6B is a block diagram showing another embodiment of the instruction cache from FIG. 3.

Turning now to FIG. 6B, a variation on the previous instruction format within instruction cache 16 is shown. In this embodiment, predecode bits 114 are stored as part of each instruction. As previously noted, predecode bits may store additional information about each instruction. For example, one predecode bit may be used to indicate the presence of a two-byte opcode (i.e., a first opcode byte of 0F (hex) in the x86 instruction set). This may advantageously reduce the maximum length of opcode field 104 to a single byte.

Figure 7:
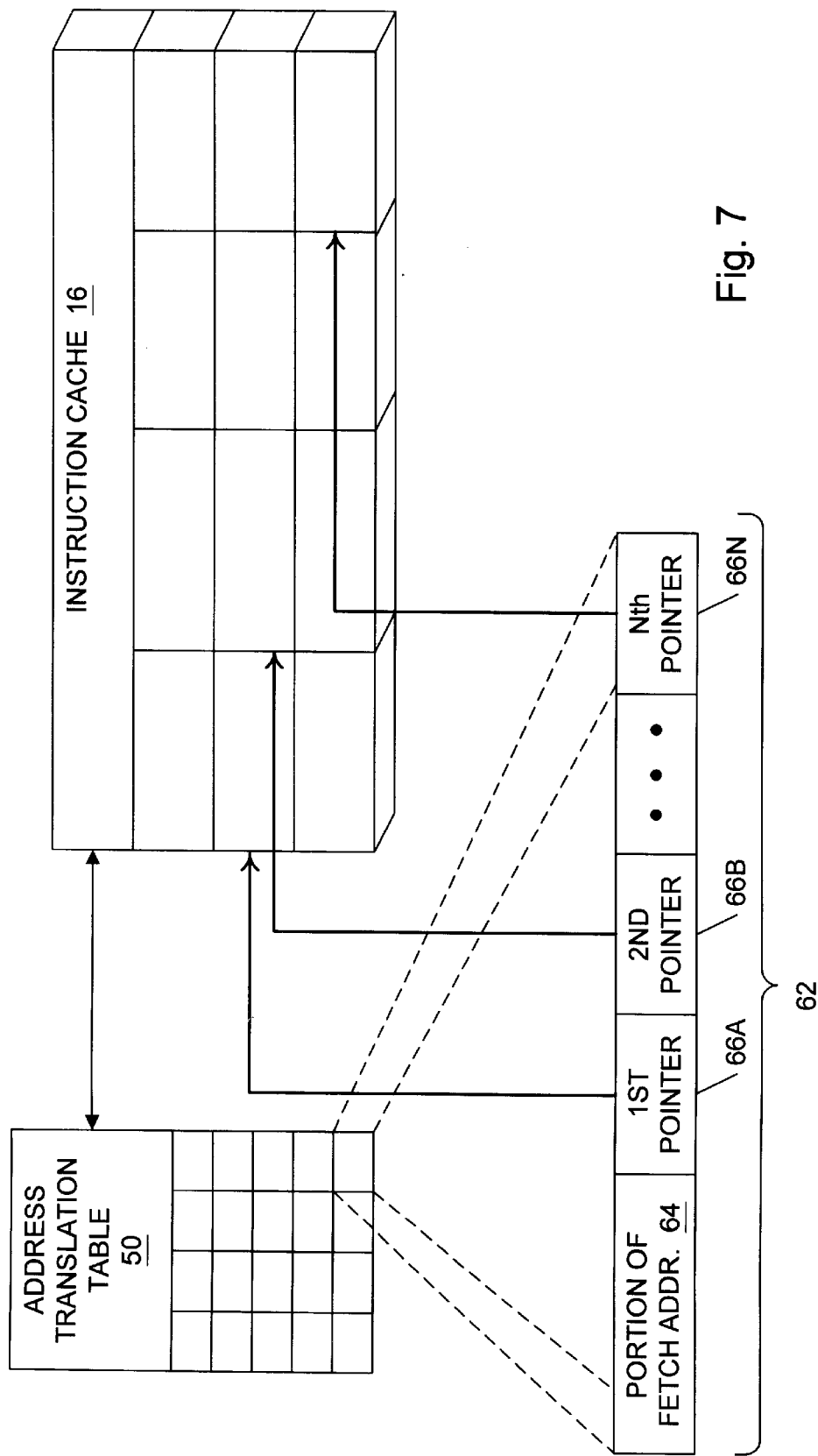
FIG. 7 is a block diagram showing more detail of another embodiment of the instruction cache from FIG. 3.

Turning now to FIG. 7, another embodiment of an address translation table entry is shown. In this embodiment, example entry 62 comprises fetch address tag 64 and pointers 66A–N. This configuration may allow "runs" or sequences of instructions to be fetched with a single fetch address. In one embodiment, branch prediction information may also be included in each entry 62. For example, assuming the instruction pointed to by pointer 66A is a branch instruction, then pointer 66B (and any subsequent pointers) may be changed to reflect the predicted outcome of the branch.

Figure 8:
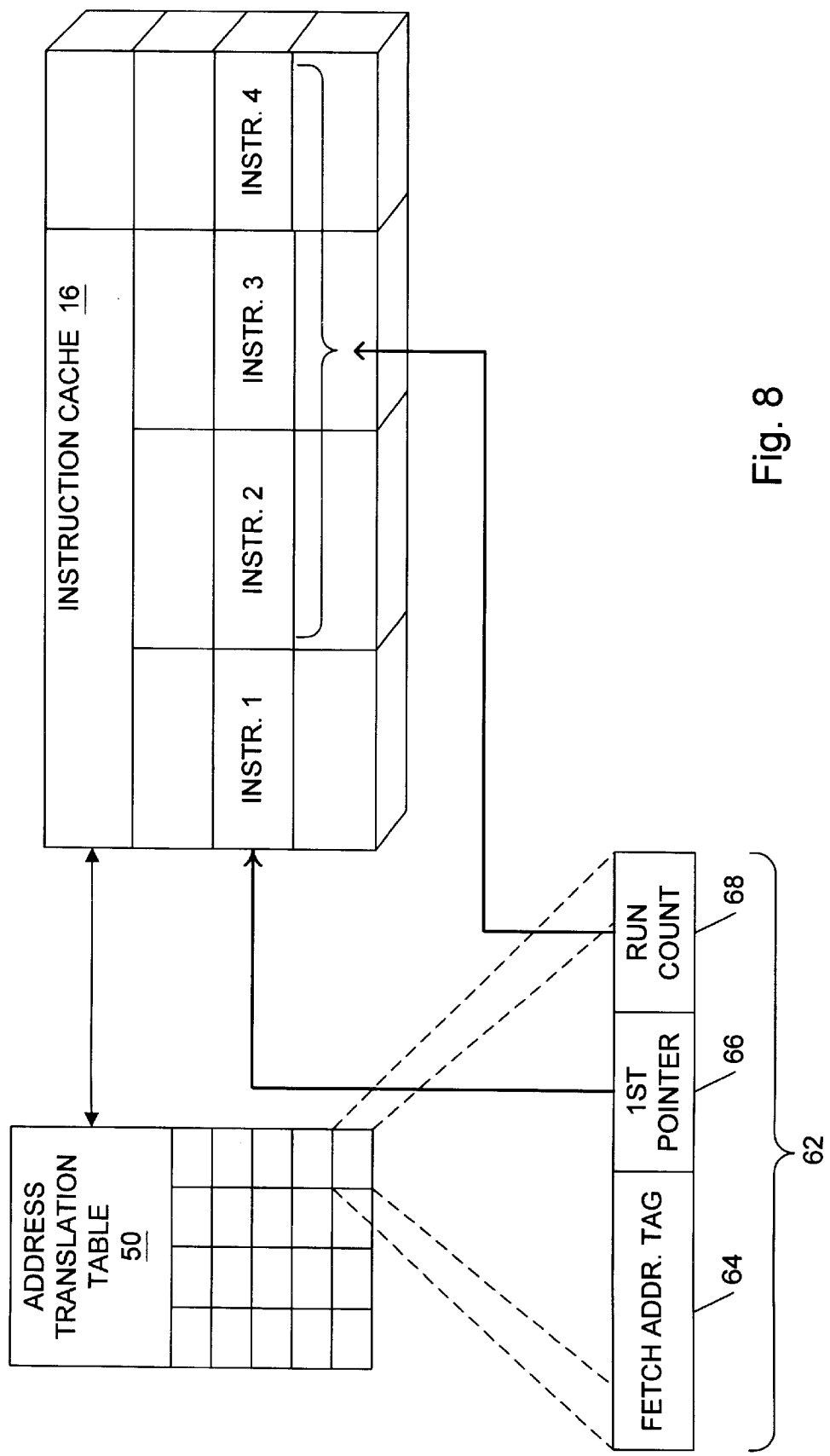
FIG. 8 is a block diagram showing more detail of yet another embodiment of the instruction cache from FIG. 3.

Turning now to FIG. 8, another embodiment of an address translation table entry is shown. In this embodiment, each entry comprises fetch address tag 64, pointer 62, and a run count value 68. Run count value 68 indicates how many instructions stored sequentially after instruction 1 (i.e., the instruction pointed to by pointer 66) are predicted to follow instruction 1. In this embodiment, instruction cache 16 and address translation table 50 may be configured to dynamically reorder instructions (and adjust pointers 66 accordingly) to increase the number of instructions that are stored sequentially.

Figure 9:
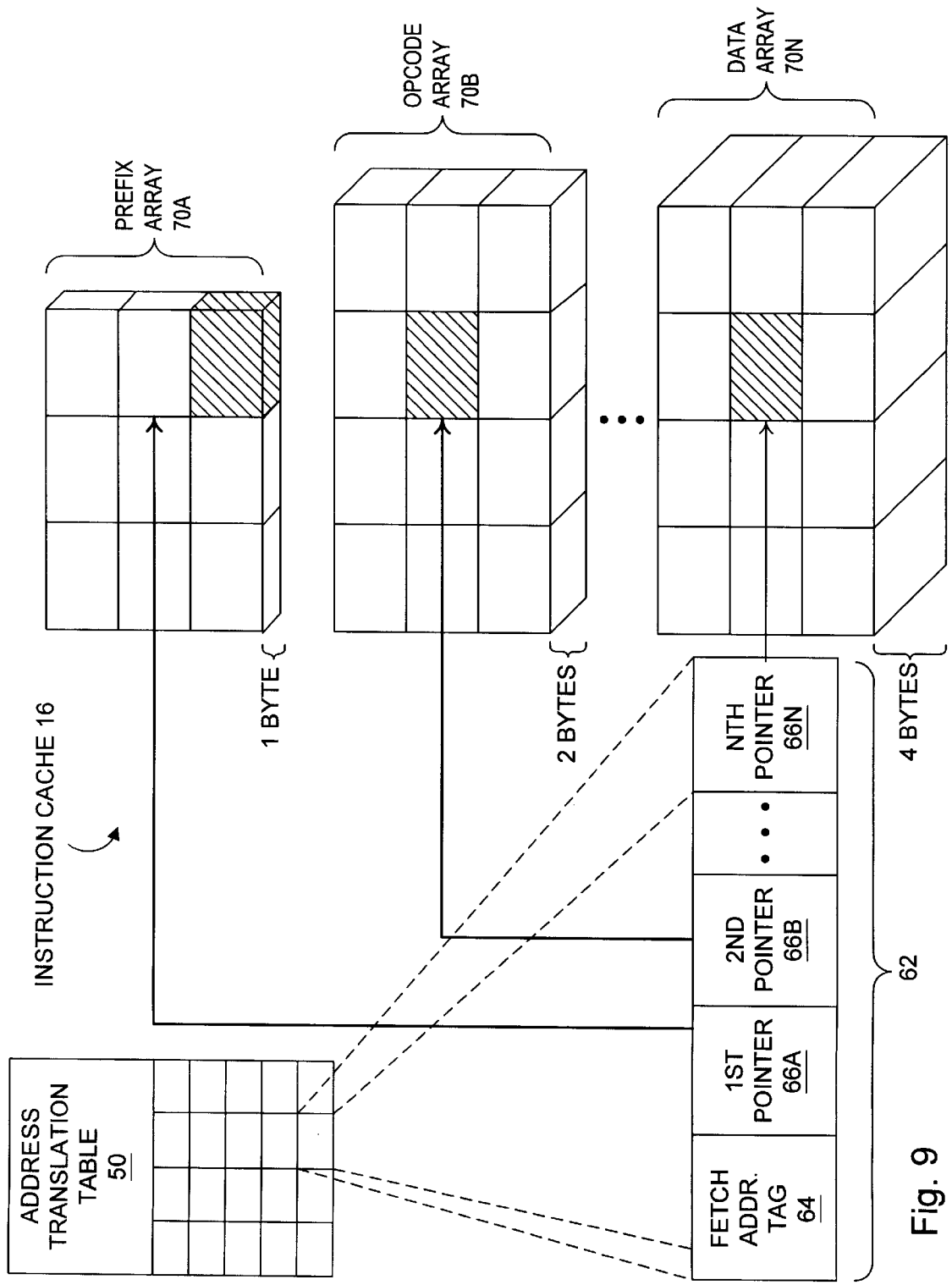
FIG. 9 is a block diagram showing more detail of still another embodiment of the instruction cache from FIG. 3.

Turning now to FIG. 9, yet another embodiment of address translation table 50 and instruction cache 16 are shown. In this embodiment, instruction cache 16 comprises a plurality of two dimensional storage arrays 70A–N, each comprising a plurality of storage locations. Each array 70A–N is configured to store one type of instruction field for each instruction stored in instruction cache 16. For example, prefix array 70A is configured with a plurality of instruction field storage locations, each configured to store one prefix instruction field. Similarly, opcode array 70B is configured to store the opcode fields of each instruction within instruction cache 16. In one embodiment of instruction cache 16, each array 70A–N may be formed on a different die layer. Other configurations, however, are also possible and contemplated. For example, all arrays may be implemented on a single layer. In another embodiment, entries in address translation table 50 may store a single pointer to the first field of the corresponding instruction, while each storage location in the arrays (excluding the final array) store a pointer to the next field of the instruction. The final array may optionally store a pointer to the next predicted instruction.

In the embodiment illustrated in the figure, each entry in address translation table 50 comprises fetch address tag 64 and pointers 66A–N. Fetch address tag 64 performs the same function as previously discussed. Pointers 66A–N, however, each point to particular field within each array 70A–B. This may advantageously allow the size of each array to be varied. For example, code analysis may show that on the average only half of the instructions processed by microprocessor 10 have prefix bytes. Thus the size of prefix array 70A may be configured to have one half the number of entries of opcode array 70B. Advantageously, each array size may be tailored to a particular size.

While the examples above have illustrated specific embodiments, other configurations are possible and contemplated. For example, in one embodiment address translation table 50 may be direct mapped with each entry no longer having a fetch address tag 64.

Exemplary Computer System

Figure 10:
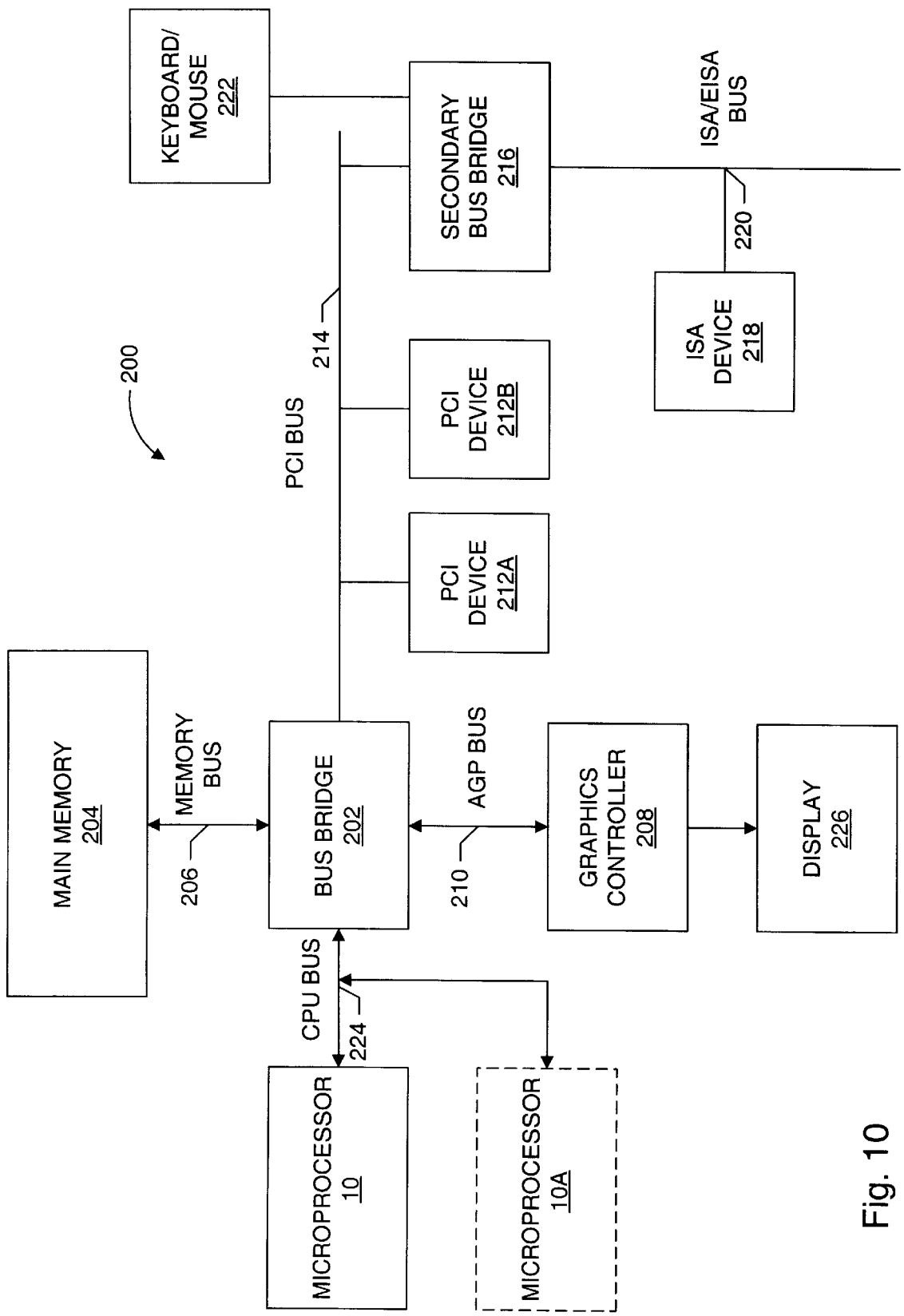
FIG. 10 is a block diagram of one embodiment of a computer system configured to use the microprocessor from FIG. 3.

Turning now to FIG. 10, a block diagram of one embodiment of a computer system 200 configured to use microprocessor 10 is disclosed. Computer system 200 is coupled to a variety of system components through a bus bridge 202 as shown. Other embodiments are possible and contemplated. In the depicted system, a main memory 204 is coupled to bus bridge 202 through a memory bus 206, and a graphics controller 208 is coupled to bus bridge 202 through an AGP bus 210. Finally, a plurality of PCI devices 212A–212B are coupled to bus bridge 202 through a PCI bus 214. A secondary bus bridge 216 may further be provided to accommodate an electrical interface to one or more EISA or ISA devices 218 through an EISA/ISA bus 220. Microprocessor 10 is coupled to bus bridge 202 through a CPU bus 224.

Bus bridge 202 provides an interface between microprocessor 10, main memory 204, graphics controller 208, and devices attached to PCI bus 214. When an operation is received from one of the devices connected to bus bridge 202, bus bridge 202 identifies the target of the operation (e.g. a particular device or, in the case of PCI bus 214, that the target is on PCI bus 214). Bus bridge 202 routes the operation to the targeted device. Bus bridge 202 generally translates an operation from the protocol used by the source device or bus to the protocol used by the target device or bus.

In addition to providing an interface to an ISA/EISA bus for PCI bus 214, secondary bus bridge 216 may further incorporate additional functionality, as desired. For example, in one embodiment, secondary bus bridge 216 includes a master PCI arbiter (not shown) for arbitrating ownership of PCI bus 214. An input/output controller (not shown), either external from or integrated with secondary bus bridge 216, may also be included within computer system 200 to provide operational support for a keyboard and mouse 222 and for various serial and parallel ports (e.g., a modem port for connecting a modem), as desired. An external cache unit (not shown) may further be coupled to CPU bus 224 between microprocessor 10 and bus bridge 202 in other embodiments. Alternatively, the external cache may be coupled to bus bridge 202 and cache control logic for the external cache may be integrated into bus bridge 202.

Main memory 204 is a memory in which application programs are stored and from which microprocessor 10 primarily executes. A suitable main memory 204 comprises DRAM (Dynamic Random Access Memory), and preferably a plurality of banks of SDRAM (Synchronous DRAM).

PCI devices 212A–212B are illustrative of a variety of peripheral devices such as, for example, network interface cards, video accelerators, audio cards, hard or floppy disk drives or drive controllers, SCSI (Small Computer Systems Interface) adapters and telephony cards. Similarly, ISA device 218 is illustrative of various types of peripheral devices, such as a modem, a sound card, and a variety of data acquisition cards such as GPIB or field bus interface cards.

Graphics controller 208 is provided to control the rendering of text and images on a display 226. Graphics controller 208 may embody a typical graphics accelerator generally known in the art to render three-dimensional data structures which can be effectively shifted into and from main memory 204. Graphics controller 208 may therefore be a master of AGP bus 210 in that it can request and receive access to a target interface within bus bridge 202 to thereby obtain access to main memory 204. A dedicated graphics bus accommodates rapid retrieval of data from main memory 204. For certain operations, graphics controller 208 may further be configured to generate PCI protocol transactions on AGP bus 210. The AGP interface of bus bridge 202 may thus include functionality to support both AGP protocol transactions as well as PCI protocol target and initiator transactions. Display 226 is any electronic display upon which an image or text can be presented. A suitable display 226 includes a cathode ray tube ("CRT"), a liquid crystal display ("LCD"), etc.

It is noted that, while the AGP, PCI, and ISA or EISA buses have been used as examples in the above description, any bus architectures may be substituted as desired. It is further noted that computer system 200 may be a multiprocessing computer system including additional microprocessors (e.g. microprocessor 10a shown as an optional component of computer system 200). Microprocessor 10a may be similar to microprocessor 10. More particularly, microprocessor 10a may be an identical copy of microprocessor 10. Microprocessor 10a may share CPU bus 224 with microprocessor 10 (as shown in FIG. 5) or may be connected to bus bridge 202 via an independent bus.

What is claimed is:

1. A microprocessor comprising:
   a predecode unit coupled to receive variable-length instructions from a main memory subsystem, wherein the predecode unit is configured to predecode the variable-length instructions by detecting instruction field boundaries within each variable-length instruction; and
   an instruction cache coupled to the predecode unit, wherein the instruction cache comprises a plurality of two-dimensional arrays of instruction field storage locations, wherein each array of instruction field storage locations is configured to store a particular instruction field.

2. The microprocessor as recited in claim 1, further comprising an address translation table coupled to the instruction cache, wherein the address translation table comprises a plurality of address entries, wherein each address entry comprises at least a portion of an instruction address and a corresponding first pointer that points to a particular instruction field storage location within one or more of the arrays in the instruction cache.

3. The microprocessor as recited in claim 2, wherein the instruction fields include at least prefix fields, opcode fields, and immediate data fields.

4. A microprocessor comprising:
- a predecode unit coupled to receive variable-length instructions from a main memory subsystem, wherein the predecode unit is configured to predecode the variable-length instructions by detecting instruction field boundaries within each variable-length instruction; and
- an instruction cache coupled to the predecode unit, wherein the instruction cache comprises an array of instruction storage locations, wherein each instruction storage location comprises an array of individual, fixed length, instruction field storage locations, wherein each instruction field storage location is configured to store a particular type of instruction field and has a fixed length that is at least long enough to store the maximum number of instruction bytes possible for the corresponding type of instruction field, and wherein the instruction cache is configured as a three-dimensional array of memory cells, wherein one of the three dimensions comprises different die layers.

5. The microprocessor as recited in claim 4, wherein each instruction field storage location comprises a plurality of byte storage locations, wherein each byte is stored on one of the different die layers.

6. The microprocessor as recited in claim 4, wherein each instruction field storage location comprises a plurality of bit storage locations, wherein each bit storage location is on one of the different die layers.

7. The microprocessor as recited in claim 4, further comprising an address translation table coupled to the instruction cache, wherein the address translation table comprises a plurality of address entries, wherein each address entry comprises at least a portion of an instruction address and a corresponding first pointer that points to a particular instruction storage location within the instruction cache, wherein each instruction field storage location further comprises storage for a valid bit.

8. The microprocessor as recited in claim 7, wherein each storage location in the address translation table further comprises storage for a second pointer, wherein the second pointer indicates the instruction storage location storing the instruction that follows, in program order, the instruction corresponding to the first pointer.

9. The microprocessor as recited in claim 7, wherein each storage location in the address translation table further comprises storage for a run value, wherein the run value indicates the number of sequential instructions following, in program order, the first instruction, wherein the sequential instructions comprise non-branch instructions and branch instruction that are predicted not taken.

10. The microprocessor as recited in claim 7, wherein each storage location in the address translation table further comprises storage for branch prediction information.

11. A microprocessor comprising:
- a means for predecoding coupled to receive variable-length instructions from a main memory subsystem, wherein the means for predecoding is configured to predecode the variable-length instructions by detecting field boundaries within each variable-length instruction; and
- a cache coupled to the predecode unit, wherein the cache comprises a fixed number of fixed-length instruction storage locations configured into an array, wherein each instruction storage location is configured to receive and store one variable-length instruction, wherein each instruction storage location comprises a plurality of sets of memory cells, wherein each set is configured to store a particular instruction field or a constant in the event that the particular instruction field is not present in the stored instruction, wherein the cache is configured as a three-dimensional array, and wherein one dimension of said three-dimensional array comprises different layers of the microprocessor's die.

12. The microprocessor as recited in claim 11, wherein the variable-length instructions are x86 instructions.

13. The microprocessor as recited in claim 11, further comprising an address translation table coupled to the instruction cache, wherein the address translation table comprises a plurality of address entries, wherein each address entry comprises at least a portion of an instruction address and a corresponding first pointer that points to the first instruction field of particular instructions stored within the instruction cache.

14. A microprocessor comprising:
- a predecode unit coupled to receive variable-length instructions from a main memory subsystem, wherein the predecode unit is configured to predecode the variable-length instructions by detecting field boundaries within each variable-length instruction; and
- an instruction cache coupled to the predecode unit, wherein the instruction cache comprises a fixed number of fixed-length instruction storage locations configured into an array, wherein each instruction storage location is configured to receive and store one variable-length instruction, wherein each instruction storage location comprises a plurality of sets of memory cells, wherein each set is configured to store a particular instruction field or a constant in the event that the particular instruction field is not present in the stored instruction, wherein each address entry further comprises additional pointers that point to the remaining instruction fields of the particular instructions.

15. The microprocessor as recited in claim 13, wherein each storage location in each array, excluding the final array, contains a pointer to the following storage location in the next array.

16. A method for storing instructions in a microprocessor comprising:
- receiving instruction bytes from a memory subsystem;
- predecoding the instruction bytes to identify instructions and field boundaries within the instructions;
- storing each field for each instruction in an instruction cache that is logically configured as three dimensional;
- storing at least a portion of each instruction's address into an address translation table;
- storing a run counter with the address portion in the address translation table, wherein the run counter is indicative of the number of instructions occurring in program order after the particular instruction before a branch instruction that is predicated taken is received.

17. The method as recited in claim 16, further comprising:
- storing a first pointer with the address portion in the address translation table, wherein the first pointer points to the storage location within the instruction cache that stores the instruction that is associated with the corresponding address portion.

18. The method as recited in claim 17, further comprising storing a second pointer with the address portion in the address translation table, wherein the second pointer points to the storage location within the instruction cache storing the instruction immediately following, in program order, the instruction that is associated with the corresponding address portion.

19. The method as recited in claim 18, wherein one of the three dimensions of the instruction cache comprises different layers of a die upon which the instruction cache is formed.

20. The method as recited in claim 19, wherein each field for each instruction is stored into a separate array configured to store each particular type of instruction field.

21. A computer system comprising:
a main memory subsystem configured to transmit variable length instructions, wherein the variable length instructions comprise a plurality of fields, wherein each field may hold a predetermined maximum number of bytes in data cells;
a first microprocessor comprising:
a predecode unit coupled to receive variable-length instructions from a main memory subsystem, wherein the predecode unit is configured to predecode the variable-length instructions by detecting instruction field boundaries within each variable-length instruction, wherein the variable-length instructions each comprise one or more instruction fields; and
an instruction cache coupled to the predecode unit, wherein the instruction cache comprises an array of instruction storage locations, wherein each instruction storage location comprises an array of fixed length instruction field storage locations, wherein each instruction storage location comprises a dedicated instruction field storage location for each type of possible instruction field, regardless of whether the particular instruction stored therein has each possible type of instruction field, wherein each instruction field storage location is configured to store a particular type of instruction field, wherein each instruction field storage location comprises at least enough memory cells to store the maximum number of instruction bytes possible for the corresponding type of instruction field, and wherein the instruction cache is logically configured as a three-dimensional array of memory cells;
a CPU bus coupled to the first microprocessor; and
a modem coupled to the CPU bus via a bus bridge.

22. The computer system as recited in claim 21, further comprising a second microprocessor coupled to the first microprocessor via the CPU bus.

23. A microprocessor implemented on a multi-layer die, the microprocessor comprising:

a predecode unit configured to receive variable-length instructions and configured to predecode the variable-length instructions by detecting instruction field boundaries within each variable-length instruction;
an instruction cache coupled to the predecode unit, wherein the instruction cache comprises an array of instruction storage locations, wherein each instruction storage location comprises an array of instruction field storage locations, wherein each instruction field storage location is configured to store a particular type of instruction field and comprises at least enough memory cells to store the maximum number of instruction bytes possible for the corresponding type of instruction field, and wherein the instruction cache is logically configured as a three-dimensional array of memory cells, wherein one of the three dimensions comprises different layers of the microprocessor's die.

24. The microprocessor as recited in claim 23, further comprising an address translation table coupled to the instruction cache, wherein the address translation table comprises a plurality of address entries, wherein each address entry comprises at least a portion of an instruction address and a corresponding first pointer that points to a particular instruction storage location within the instruction cache.

25. The microprocessor as recited in claim 24, wherein each storage location in the address translation table comprises storage for a second pointer, wherein the second pointer indicates the instruction storage location storing the instruction that follows, in program order, the instruction corresponding to the first pointer.

26. The microprocessor as recited in claim 23, wherein each instruction field storage location comprises a fixed length plurality of byte storage locations, wherein each byte is stored on a different layer of the microprocessor's die.

27. The microprocessor as recited in claim 23, wherein each instruction field storage location comprises a plurality of bit storage locations, wherein each bit storage location is on a different layer of the microprocessor's die.

28. The microprocessor as recited in claim 23, wherein each storage location in the address translation table further comprises storage for a run value, wherein the run value indicates the number of sequential instructions following, in program order, the first instruction, wherein the sequential instructions comprise non-branch instructions and branch instruction that are predicted not taken.

* * * * *